US010108735B2

(12) United States Patent
Dingwall et al.

(10) Patent No.: US 10,108,735 B2
(45) Date of Patent: Oct. 23, 2018

(54) SYSTEM AND METHOD OF EMBEDDED APPLICATION TAGS

(71) Applicant: Esna Technologies Inc., Richmond Hill (CA)

(72) Inventors: Bryan Dingwall, Mississauga (CA); Mohammad Nezarati, Richmond Hill (CA); Sergey Vlasenko, St. Petersburg (RU)

(73) Assignee: Esna Technologies Inc. (CA)

( * ) Notice: Subject to any disclaimer, the term of this patent is extended or adjusted under 35 U.S.C. 154(b) by 154 days.

(21) Appl. No.: 14/630,764

(22) Filed: Feb. 25, 2015

(65) Prior Publication Data

US 2015/0242526 A1 Aug. 27, 2015

Related U.S. Application Data

(60) Provisional application No. 61/944,450, filed on Feb. 25, 2014.

(51) Int. Cl.
*G06F 17/00* (2006.01)
*G06F 17/30* (2006.01)
*H04L 29/08* (2006.01)

(52) U.S. Cl.
CPC ........ *G06F 17/30893* (2013.01); *H04L 67/02* (2013.01)

(58) Field of Classification Search
CPC ............................ G06Q 30/02; G06F 17/2247
USPC .................................................. 715/234, 200
See application file for complete search history.

(56) References Cited

U.S. PATENT DOCUMENTS

| | | | | |
|---|---|---|---|---|
| 6,094,657 | A * | 7/2000 | Hailpern | G06F 17/3089 707/740 |
| 6,212,535 | B1 * | 4/2001 | Weikart | G06Q 10/107 709/206 |
| 7,941,553 | B2 * | 5/2011 | Baumeister et al. | 709/231 |
| 7,987,492 | B2 * | 7/2011 | Liwerant et al. | 725/115 |
| 8,190,703 | B2 * | 5/2012 | Lin | G06F 17/30893 709/205 |
| 8,296,357 | B2 * | 10/2012 | Stone et al. | 709/203 |
| 8,667,480 | B1 * | 3/2014 | Sigurdsson | G06F 8/65 717/168 |
| 9,274,913 | B2 * | 3/2016 | Kay | G06F 11/30 |
| 2004/0122730 | A1 * | 6/2004 | Tucciarone | G06Q 10/107 705/14.36 |
| 2007/0174415 | A1 * | 7/2007 | Cha | G06F 9/45512 709/217 |
| 2008/0005276 | A1 * | 1/2008 | Frederick | 709/218 |
| 2008/0092054 | A1 * | 4/2008 | Bhumkar | G06F 17/30899 715/739 |
| 2008/0255943 | A1 * | 10/2008 | Morten | G06Q 30/02 705/14.53 |
| 2009/0106104 | A1 * | 4/2009 | Upendran | G06Q 30/0252 705/14.5 |

(Continued)

*Primary Examiner* — Manglesh M Patel
(74) *Attorney, Agent, or Firm* — Sheridan Ross, P.C.

(57) ABSTRACT

A method is provided for receiving and rendering web content on a client device having an installed actor app. Web content containing an embedded application tag is requested from a server. The web content is received from the server on the client device. The actor app receives and injects a value in the embedded application tag from dynamic data received with the web content. The web content is displayed together with the value of the dynamic data on the client device.

20 Claims, 4 Drawing Sheets

(56) References Cited

U.S. PATENT DOCUMENTS

| | | | | |
|---|---|---|---|---|
| 2010/0153848 | A1* | 6/2010 | Saha | G06F 17/30884 715/721 |
| 2011/0246661 | A1* | 10/2011 | Manzari et al. | 709/231 |
| 2013/0227394 | A1* | 8/2013 | Sazhin | G06F 17/30899 715/234 |
| 2013/0254417 | A1* | 9/2013 | Nicholls | 709/231 |

* cited by examiner iLink collaboration tags test

Here is a simple list

- First Last
- First Last
- First Last
- Sergey
- Mo
- Arno
- Davide

Also there is an inline element sample bryand@esna.com provided.

iLink collaboration tags test

Here is a simple list

- ⊛ First Last
- ⊛ First Last
- ⊛ First Last
- ⊛ Sergey
- ⊛ Mo

Mohammad Nezarati
Unavailable

Also t                                                        ovided.

SYSTEM AND METHOD OF EMBEDDED APPLICATION TAGS

CROSS-REFERENCE TO RELATED APPLICATIONS

This application claims the benefit of U.S. Provisional Patent Application No. 61/944,450, filed Feb. 25, 2014 entitled "System and Method of Embedded Application Tags," which is incorporated herein by reference in its entirety.

FIELD OF INVENTION

The field of invention is generally related to internet technologies and in particular is related to methods of providing dynamic content in web pages, web applications and documents.

BACKGROUND

Current web pages and applications rely on a combination of static and dynamic HTML, JavaScript and server-side applications in order to render content to end users.

Static HTML once rendered cannot be changed, it does not have database access and no interactions persist between browser (user) and server. Most static HTML does not require server side coding. Standard HTML pages are static web pages. They contain HTML code, which defines the structure and content of the web page. Each time an HTML page is loaded, it looks the same. The only way the content of an HTML page will change is if the Web developer updates and publishes the file.

Web pages leveraging JavaScript or Dynamic HTML can be changed, and provide dynamic pages that can be connected to databases. JavaScript and Dynamic HTML allow a browser (user) to interact with the server but may require server side coding. PHP, JSP and ASP may be used for implementing JavaScript or Dynamic HTML which contain "server-side" code.

When a company needs to integrate or add new dynamic or real-time functionality into their web-based offerings (which functionality may or may not be directly relevant to their content), they can either opt to build such functionality in-house from scratch or leverage services from third parties by using APIs provided by these entities.

Although building the services/functionality in-house provides complete control over all aspects of the service, such custom development will certainly take longer, cost more and may lead the developer into many pitfalls if this field is not their main forte. Where the functionality is not directly related to the company's content, it may be difficult to justify such time and cost investment.

Given the pitfall of in-house development as mentioned above, it has become common place for developers to use as many services from third parties as possible without losing control and offering the net new features in the field where their forte lies.

The use of APIs and web services has increased lately, and provides a nimble and fast to implement method. But despite a lot of information being available about APIs and web services, it still takes a deep understanding and a fair amount of work to implement them.

When using APIs from different third parties, such use is complicated and requires an understanding of different APIs as each API may have a different setup and format and may require contrasting infrastructure choices. Additionally the cost of transition from one API set to another can be prohibitive and this cost never adds business value.

It would be desirable to allow a simple and inexpensive means for new dynamic or real-time functionality to be incorporated into web documents, pages, or applications.

SUMMARY

Broadly speaking, the present system and method of the invention enables a developer to leverage the services that are already being provided by an actor app and be able to consume this information with little or no technical knowledge by simply embedding application tags into any markup language e.g. HTML.

The embedded application tags are identified and picked up by an application, the "actor app", which is not directly related to the web page the viewer is currently on. These embedded application tags are designed to provide developers and third parties with simple tools that can be used to display real time information to a viewer of the web application, document or page. For example, and in particular, real-time communications functions can be provided as options in response to application tags which are embedded in web pages. Thus the invention offers a simple, declarative method of preparing web documents, pages, or applications with the majority of the complexity offloaded into the "actor app".

The system and method allows a developer or a third-party to embed application tags into HTML and these tags are then fed by an actor app that is also installed on the device where the HTML is being viewed. In the preferred embodiment the embedded application tags may refer to realtime communications e.g. information about presence, location, telephony, messaging, contact etc. information that makes collaboration more effective and efficient.

A generic, quasi-API style layer is provided that allows third party developers/vendors to implement hooks to include real-time presence, voice and video call actions, chat actions, instant meetings etc. into their apps by simply embedding the application tags of the invention into their HTML pages.

For example, the embedded application tags may be used in an inventory management or selling platform. An inventory page can list items that are available for sale. The actor app injects real time changes to inventory, spot prices or comparative pricing into the HTML where the application tags are embedded.

In another example, the embedded application tags may be used in a news or event page. The actor application can insert related or updated information into the tagged content in real time while the user is browsing the page.

In a preferred embodiment, the system and method provides application tags that can be embedded directly in HTML e.g. an HTML page. When the actor app is running on the device where the HTML page is being viewed, the actor app injects information (values) in the tags. If the actor app is not installed on the device or is not running, the embedded application tags are empty and stay transparent by not being displayed to the user.

The actor app may provide the communications functionality. Thus any developer by embedding the application tags in their HTML page can take advantage of the entire communications stack that is offered by the actor app. In one example, the actor app may be implemented as a browser extension or add-on framework.

The actor app may also be implemented as a standalone app e.g. an app specifically designed for Apple iOS and installed on an Apple iPhone5.

Devices that can advantageously use the invention may include but are not limited to a PC, Smartphone, tablet, SmartTV, server, and any internet connected device capable of running a browser where HTML can be executed. The embedded application tags may have clickable actions and the actor app injects the values in these embedded application tags for a control, such that a user may click on one such link and the actor app can then complete this action. The actor app may execute voice or video calls, or other type of messaging that may be initiated by a user as a result of interacting with the embedded application tags and the information that they provide.

The clickable actions may include providing a URL that upon clicking takes a user to the intended website. Other clickable actions may include initiating a voice call, a video call, SMS, IM or other form of communications session through the actor app.

The embedded application tags may have clickable actions, and a third party app or a web service may be called as a result of the clickable action that these tags provide. An exemplary clickable action may initiate a communications session e.g. a voice call with another user. Similarly, a developer may be able to embed the application tags in an e-mail signature, an SMS, an IM message etc. so that any recipient of that e-mail, SMS or IM message may initiate a communications session with ease. Further, the actor app may be able to invoke functionality into the target web page or application, such as invoking a screen pop from relevant data tied to an event that occurs in the actor app (e.g. receiving an incoming call, emergency alert or notification).

Thus, the system and method leverages existing web and browser technology protocols e.g. WebRTC, HTML5 to make a broadly compatible solution that is easily usable by developers.

The embedded application tags are preferably hidden and transparent to the user if the actor app feeding these tags is either not installed or is not running on the device. If the actor app is installed and running on the device where the HTML page with embedded application tags is being viewed, then these tags will be populated, allowing the user to interact with them.

The tags allow for a simplified, declarative method of preparing described web documents or pages, which enables highly simplified implementation with majority of the complexity offloaded into the "actor" application.

The solution is not limited to enterprise users, but such embedded application tags can be used by anyone for a simple means of accessing dynamic content. The tags are embedded in HTML, and an actor app runs on the same system to populate these tags. Such embedded application tags may for example provide weather, inventory, spot prices, live survey results and other such information that changes continuously.

According to a first aspect of the invention, a method is provided for receiving and rendering web content on a client device having an installed actor app. Web content is requested from a server, which contains an embedded application tag. The web content is received from the server on the client device. The actor app receives and injects a value in the embedded application tag from dynamic data received with the web content. The web content is displayed together with the value of the dynamic data on the client device.

The web content may be selected from the group consisting of HTML and WebRTC.

The web content may, for example, be displayed on a web browser, or on a web application.

Preferably, the dynamic data is a value. This value may be refreshed at selected intervals, such as when the value changes.

The embedded application tag may include formatting instructions for the dynamic data (or these may be rendered leveraging Cascading Style Sheet objects, for example).

The embedded application tag may render a link that can be accessed to display the dynamic data.

The embedded application tag may include instructions for rendering a graphic representing a link that can be accessed to display the dynamic data.

In at least one embodiment, the embedded application tag includes a clickable action (e.g. allowing the user to initiate a communications session).

According to a second aspect of the invention, a method is provided for receiving and rendering web content on a client device. Web content is requested from a server, which contains an embedded application tag. The system determines whether an actor app has been installed on the client device. Web content is received from the server on the client device. If the actor app is present, a value is received and injected in the embedded application tag from dynamic data received with the web content. The web content is displayed together with the value of the dynamic data on the client device.

If the actor app is not present, the dynamic data may not be received at all, may be received but hidden (e.g. using hidden attribute with the embedded application tag), or may not be displayed.

BRIEF DESCRIPTION OF THE FIGURES

In FIG. 4 (fed by an active actor application), certain contacts have links to additional information 420, 430.

In FIG. 6 (fed by an active actor application), the names have links to additional information (one is shown displayed with additional clickable actions).

DETAILED DESCRIPTION

Figure 1:
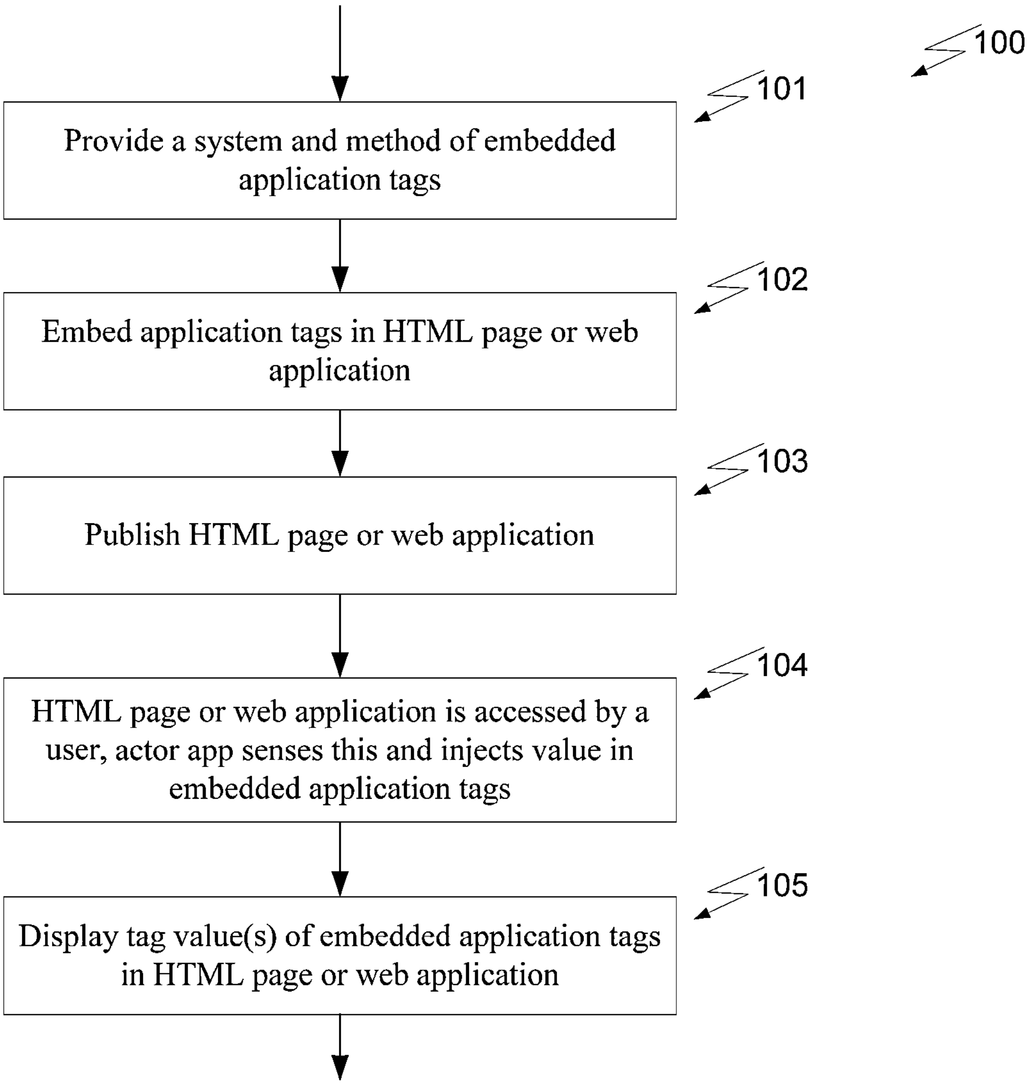
FIG. 1 is a flow diagram illustrating a basic method of using embedded application tags according to an aspect of the present invention.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements, as is common practice within the art. However, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. LAMP (Linux, Apache, MySQL and PHP) is an example of a well-known open-source Web development platform. Other examples of environments and frameworks using which computer code may also be generated are Ruby on Rails which is based on the Ruby programming language, or node.js which is an event-driven server-side JavaScript environment.

In the preferred embodiment of the invention the program code may execute entirely on the server (or a cluster of servers), partly on a server and partly on a user's computer, as a stand-alone software package, partly on the user's computer and partly on a remote computer or entirely on the remote computer or server. In the latter scenario, the remote computer may be connected to the user's device e.g. a Smartphone through any type of network, including a local area network (LAN) or a wide area network (WAN), or the connection may be made to an external computer (for example, through the Internet using an Internet Service Provider).

A device that enables a user to engage with an application using the invention, including a memory for storing a control program and data, and a processor (CPU) for executing the control program and for managing the data, which includes user data resident in the memory and includes buffered content. The computer may be coupled to a video display such as a television, monitor, or other type of visual display while other devices may have it incorporated in them (iPad). An application or a game or other simulation may be stored on a storage media such as a DVD, a CD, flash memory, USB memory or other type of memory media or it may be downloaded from the internet. The storage media can be inserted to the device where it is read. The device can then read program instructions stored on the storage media and present a user interface to the user. It should be noted that the terms computer, device, Smartphone etc. have been used interchangeably but imply any device that where HTML can be executed in a browser and an actor app can be installed and executed.

FIG. 1 shows a flow diagram of certain overarching concepts of one embodiment of the method 100. A system and method of embedded application tags is provided 101. The system and method provide a mechanism for developers to embed application tags in HTML. For example, the tags may be used to enable voice and video communications, provide presence and location information inside of the HTML page where these application tags are embedded.

In one embodiment a generic, quasi-API style layer is provided that allows third party developers/vendors to implement hooks to include real-time presence, voice and video call actions, chat actions, instant meetings etc. into their apps.

Devices where invention can be advantageously used include but are not limited to a personal computer, a Smartphone, a tablet, any kind of computer or connected device where a browser is installed and the actor app of the invention can be installed e.g. a SmartTV.

In one embodiment the embedded application tags update any information that the actor app injects into these tags. The embedded application tags may provide presence, location, telephony, messaging, contact etc. information to make communication and collaboration more effective and efficient.

In another example, the embedded application tags may be used in an inventory management or selling platform. An inventory page can list items available that are available for sale. The actor app injects real time changes to inventory, spot prices or comparative pricing into the HTML where the application tags are embedded.

In yet another example, the embedded application tags may be used in a news or event page. The actor application can insert related or updated information into the tagged content in real time while the user is browsing the web page.

The developer embeds application tags in the HTML page or web application 102. A "tag" is a command inserted in a document that specifies how the document, or a portion of the document, should be formatted. Tags are used by all format specifications that store documents as text files. HTML offers many of the conventional publishing idioms for rich text and structured documents, including hypertext and interactive documents.

The embedded application tags may also be advantageously embedded in an e-mail and other electronic text communications e.g. a signature. A signature or signature block allows a user to set one or more lines of custom text that are automatically appended to their messages. A signature is a block of text that is appended to the end of an e-mail message. Generally, a signature is used to provide the recipient with the sender's name, e-mail address, business contact information, or website. The signature can include text or graphic images.

The embedded application tags may use the HTML hidden attribute. This allows for graceful hiding in cases where extension is not running or otherwise not available to the end user.

The hidden attribute is supported in all major browsers, except Internet Explorer. The hidden attribute is a Boolean attribute. When present, it specifies that an element is not yet, or is no longer, relevant. Browsers should not display elements that have the hidden attribute specified. The hidden attribute can also be used to keep a user from seeing an element until some other condition has been met (like getting the value for the embedded application tag from the app). Then, a JavaScript could remove the hidden attribute, and make the element visible.

```
<p hidden>This paragraph should be hidden.</p>
  <article hidden>
    <h2>Article #1</h2>
    <p>Lorem ipsum ...</p>
  </article>
```

The HTML page or web application is published 103. The process of putting the code for a website on the Internet is referred to as publishing. The website contents are stored on servers that run special software that allow them to be able to serve web pages to anyone who requests them. Thus whenever a user types www.google.com into a web browser, the server that stores the data for www.google.com sends the contents (in the form of code) of that website's home page to the web browser. The web browser then converts that code into something meaningful that appears on the screen where the web browser is running e.g. a SmartPhone or a computer.

The internet web pages are served by a DNS (Domain Name Server) system. DNS is a system that contains a large database of all the websites in the world together with the IP address of the servers they are stored. When a user types a web address into a web browser, the browser takes the domain name, looks it up through the DNS system, gets its IP address, connects to that server, gets the file for the user and converts it into meaningful data that is displayed on screen of the device where the web browser is running.

When a user accesses the HTML page or web application, the actor app senses this and injects values in the embedded application tags 104. The actor app may for example inject presence and telephony related values into the embedded application tags embedded in a sales force automation application.

The actor app may inject a link into the value of an embedded application tag. The WebLink, hyperlink or link is a basic hypertext construct. The default behavior associated with a link is the retrieval of another Web resource. This may be any Web resource e.g., an image, a video clip, a sound bite, a program, an HTML document, an element within an HTML document, etc.

Figure 4:
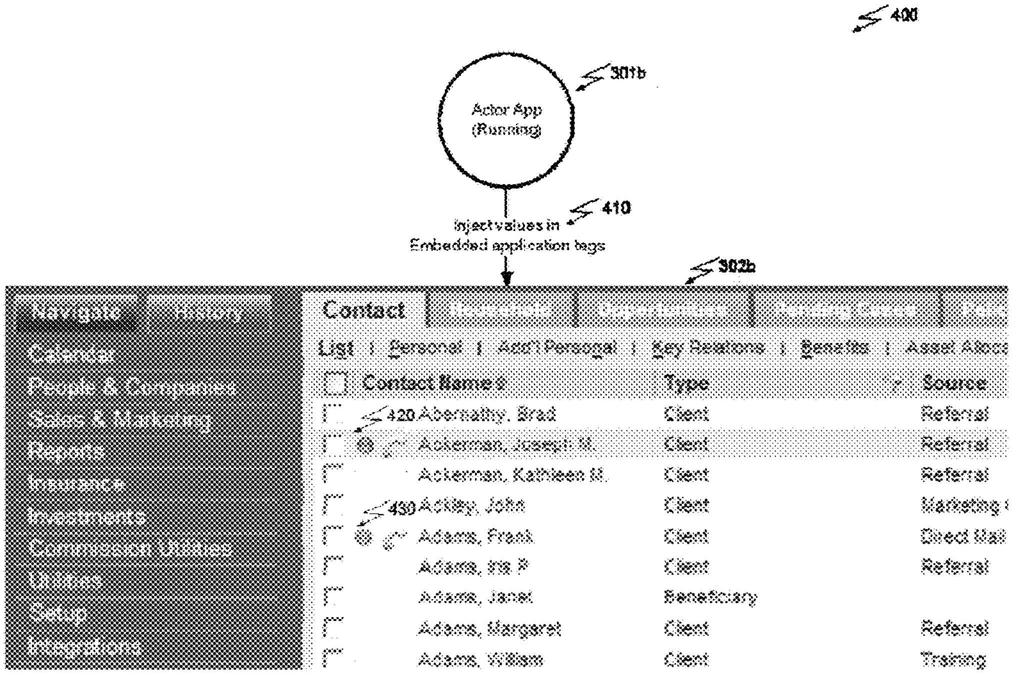

The tag value(s) of the embedded application tags are then displayed through the HTML page or web application 105. This may for example display text and icons as shown in FIG. 4. For example the presence may be shown by a bubble and the color of the bubble may represent the presence status. For example when the bubble is green, it implies that the person is online and available; red implies that the person is online but is not available (busy); while a grey icon may imply that the person is off line.

The link may also be displayed as a hyperlink in the HTML page.

Figure 2:
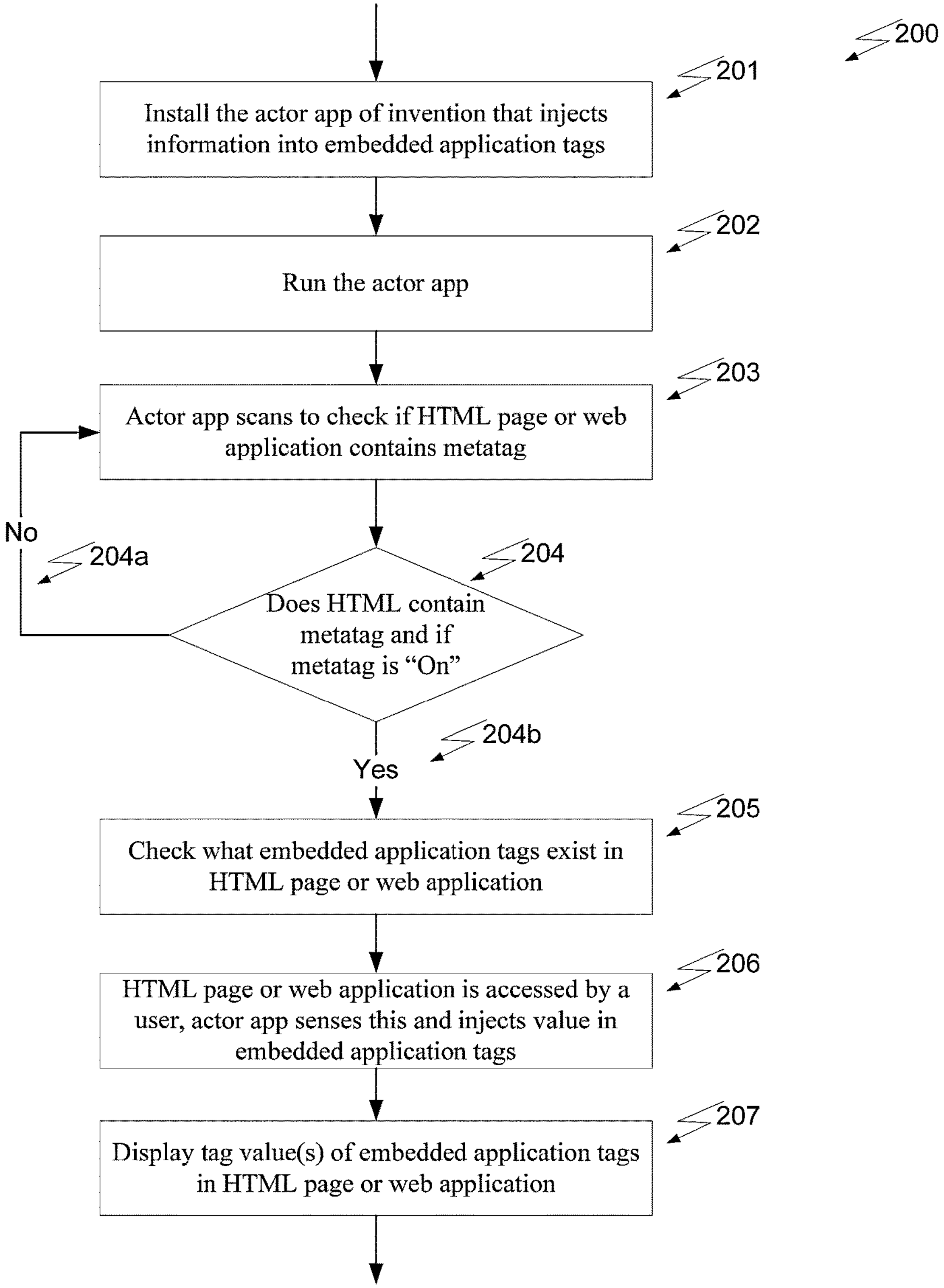
FIG. 2 is a flow diagram illustrating the method with detection of a metatag prior to attempted rendering of the embedded application tags.

FIG. 2 shows an example of process flow 200. The actor app may be first installed 201. This actor app injects information into embedded application tags on an exemplary device e.g. a Smartphone.

The actor app may be an extension e.g. a Google Chrome extension. Chrome extensions are small software programs that can modify and enhance the functionality of the Chrome browser. Generally extensions have little to no user interface. A developer may code an extension by using web technologies such as HTML, JavaScript, and CSS. Extensions bundle all their files into a single file that the user downloads and installs. This bundling means that, unlike ordinary web apps, extensions don't need to depend on content from the web. An extension may be distributed using the Chrome Developer Dashboard to publish to the Chrome Web Store.

The actor app may also be a native app custom developed for a particular operating system and downloaded from the OS vendor; e.g. it may be an app specifically developed for iOS, downloaded from the Apple AppStore and installed and running on an Apple iPhone5.

The embedded application tags may have clickable actions that may be completed by the actor app. As an example, the embedded application tags may enable a user to click on the information that the actor app has injected into the HTML to start a communications session e.g. a voice call with another user. Similarly a developer may embed the embedded application tags in a web page or an e-mail signature to enable an SMS or an IM message session to be initiated.

The actor app may enable a voice or video session to be established between end devices using technologies like WebRTC which include the fundamental building blocks for communications on the web such as network, audio and video components used in voice and video chat applications. These components, when implemented in a browser, allow access to the camera and microphone, enable set up of audio and video calls and allow web browsers to share data via peer-to-peer communications.

The PSTN (Public Switched Telephone Network) is the aggregate of the world's circuit-switched telephone networks that are operated by national, regional, or local telephony operators, providing infrastructure and services for public telecommunication. The PSTN consists of telephone lines, fiber optic cables, microwave transmission links, cellular networks, communications satellites, and undersea telephone cables, all interconnected by switching centers, thus allowing any telephone in the world to communicate with any other. Originally a network of fixed-line analog telephone systems, the PSTN is almost entirely digital in its core and includes mobile as well as fixed telephones.

A PBX (Private Branch Exchange) is a telephone exchange that serves a particular business or office, as opposed to one that a common carrier or telephone company operates for many businesses or for the general public. PBXs make connections among the internal telephones of a private organization, usually a business, and also connect them to the PSTN via trunk lines. Because they incorporate telephones, fax machines, modems, and more, the general term "extension" is used to refer to any end point on the branch.

Traditionally text messaging is referred to sending and receiving short text messages using the Short Message Service (SMS). Text messaging is the act of typing and sending a brief, electronic message between two or more mobile phones or fixed or portable devices over a phone network. It has grown to include messages containing image, video, and sound content, known as Multi-media Messaging (MMS).

Instant messaging is a set of communication technologies used for text-based communication between two or more participants over the Internet or other types of networks. IM—chat happens in real-time. Online chat and instant messaging differ from other technologies such as email as they are real time communications by the users. Some systems permit messages to be sent to users not they are off line, by sending the message to the associated email account.

The embedded application tags may have clickable actions to call a third party app or a web service.

The actor app is run 202. In some cases a user interaction may be required to run the actor app e.g. double clicking an icon or touching an icon on a touchscreen interface. In alternate cases the app may self run, for example when the device is started it automatically runs the app. In some cases the app may run in the background.

The actor app may scan the HTML page or web application for a metatag 203. A special HTML <META> tag may be used to tell the actor app that there are no embedded application tags in the content of a page, therefore the app does not need to scan the rest of the page searching for them.

This <META> tag is preferably placed in the HEAD section of an HTML page and preferably is put in every page of the website where collaborative tags are used.

The system checks if the HTML page or web application includes the metatag and if the metatag is on 204. If the metatag is either not present or is present but is "off" 204*a*, the system does not scan the rest of the HTML page or web application for embedded application tags but continues to scan the HTML page or web app for the metatag 203.

If the metatag is present and is "on" 204*b*, then the system checks what embedded application tags are present in the HTML page or web application 205. If the HTML <META> tag states that there are embedded application tags in the content/body of the HTML page, then the actor app may scan the rest of the HTML page searching for these tags.

When the user accesses the HTML page or web application, the actor app senses this and injects values in the embedded application tags 206.

Tag values of embedded application tags are displayed through the HTML page or web application 207. Clickable actions may optionally be provided from the tag values. These may be completed by the actor app or by a third party application or web service.

Figure 3:
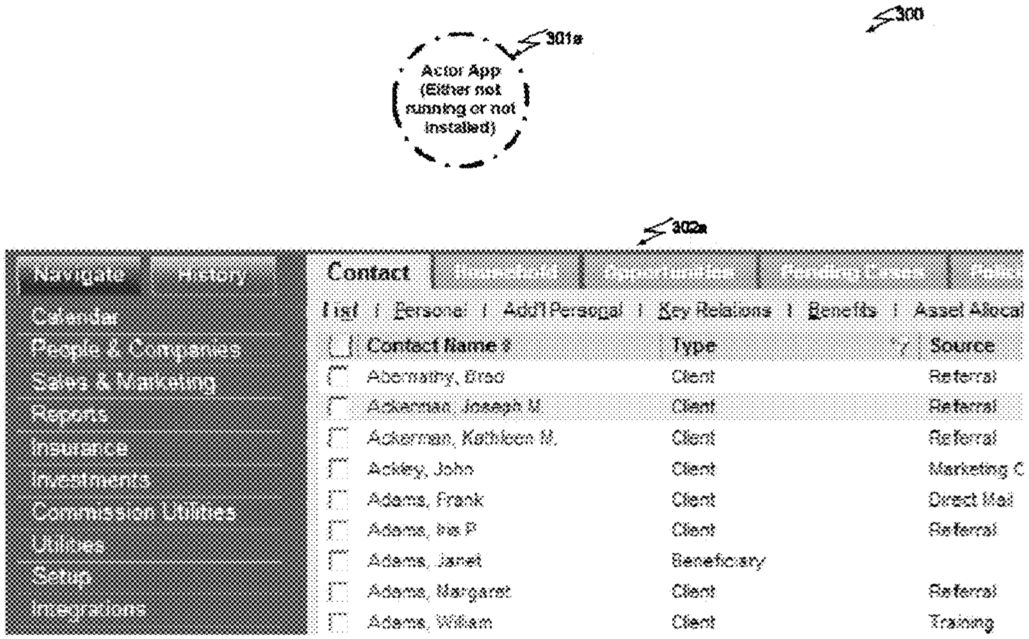
FIGS. 3 and 4 are screenshots showing a sample contact management window.

FIG. 3 shows one example 300 showing a webpage 302*a* where the embedded application tags may be embedded but are transparent to the user as the Actor App 301*a* is either not installed or running.

When implementing the embedded application tags, the developer will preferably use the HTML hidden attribute. Using these attributes allows for graceful hiding in cases where the extension is not running or otherwise not available to the end user.

FIG. 4 shows one example 400 showing a webpage 302*b* where the Actor App 301*b* is installed and running. Comparing FIG. 3 and FIG. 4, we see that in FIG. 4 the values of the embedded application tags for users joseph.ackerman@esna.com 420 and frank.adams@esna.com 430 have been populated into the embedded application tags.

The code sample below would result in rendering a presence "bubble" image for the users joseph.ackerman@esna.com 420 and frank.adams@esna.com 430 at that location in the web page or web application with the current status for the user (whether on/offline, available, etc) when an appropriate extension is running.

```
<!-<?xml
version="1.1" encoding="utf-8"?>
<iLinkAction
xmlns:xsi="http://www.w3.org/2001/XMLSchema-instance"
    xsi:noNamespaceSchemaLocation="EsnaActions.xsdn">
  <Type>Presence</Type>
  <Destination>joseph.ackerman@esna.com,
frank.adams@esna.com</Destination>
```

-continued

```
    <Type>Bubble, Small</Type>
    <Options></Options>
  </Address>
  </iLink
  Action>
  -->
```

Presence refers to the ability to detect the electronic presence of other users who are connected to the Internet, through a PC or mobile device, and whether they are available in real time. Presence information has wide applications in many communication services and are commonly used in applications like instant messaging clients, and discussion forums, VoIP clients etc.

Presence is a status indicator that conveys ability and willingness of a potential communication partner. A user's client provides presence information (presence state) via a network connection to a presence service, which is stored in what constitutes his personal availability record and can be made available for distribution to other users to convey the availability for communication.

A user's presence and the granularity of the user's presence regarding privacy preferences and who can see the presence information may be controlled by a user's definable privacy options.

The embedded application tags may be implemented using simple declarative tags which follow with the developer's existing layout and have no effect on the web page or application when the actor application is not in use. The example in FIGS. 5 and 6 is of a simple web page that lists Names in a page with prepared content using application tags.

Figure 5:
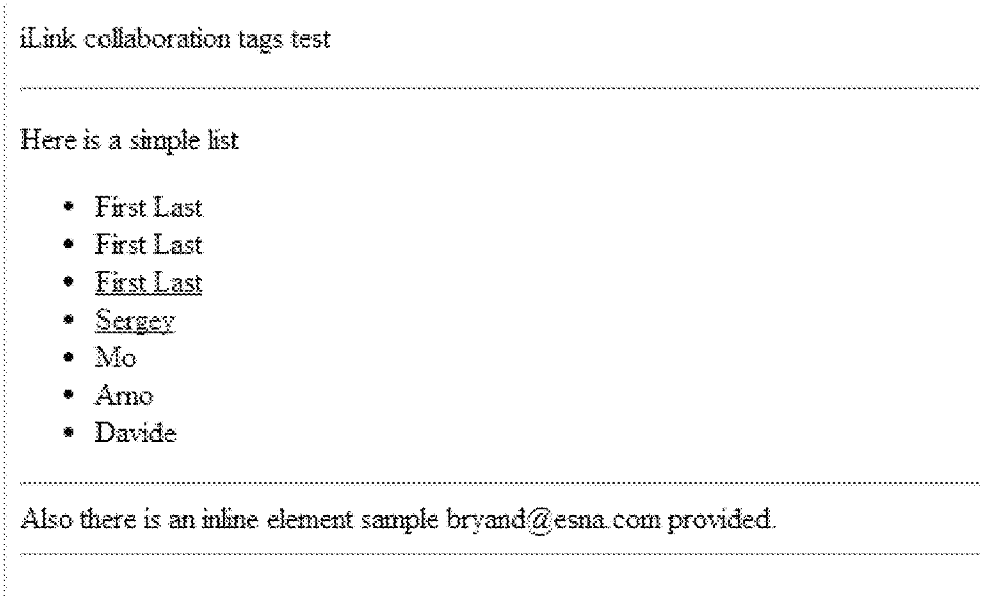
FIGS. 5 and 6 are screenshots of a sample web page with a list of names.

FIG. 5 shows a web page published using embedded application tags without the actor application running or installed.

Figure 6:
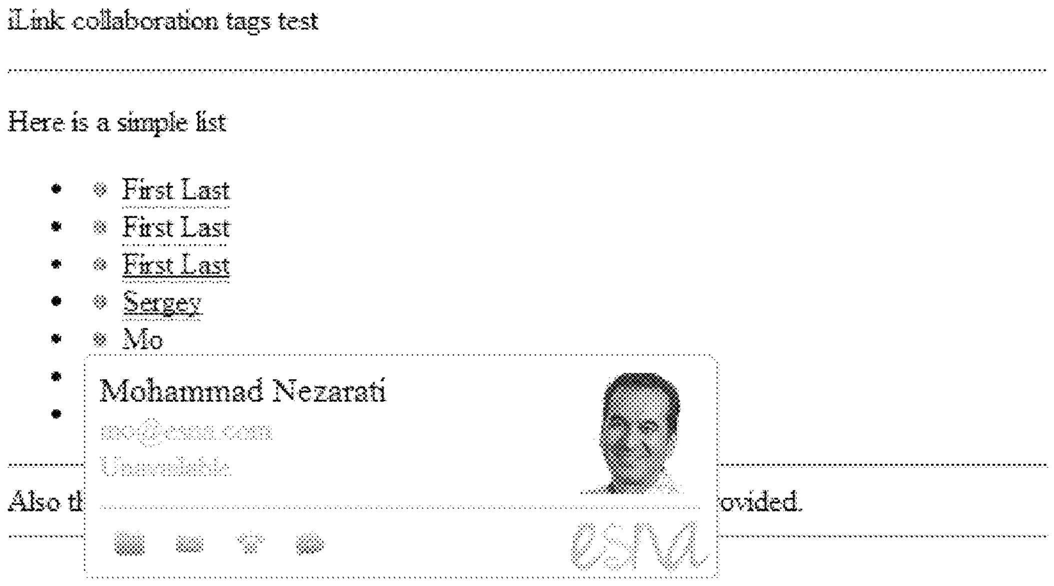

FIG. 6 shows the same web page with the embedded application tags having content injected by actor application (presence and "hover card" with further actions) into the same web page as FIG. 5 but with the actor application installed and running.

The below code snippet represents the content shown in FIGS. 5 and 6. It can be noted that nothing describing how the contact card or presence information is to be shown is included in the tagged content. The actor application determines what content is required and injects all content upon page loading. Further adjustments can be done to affect the styling from the default leveraging Cascading Style Sheet (CSS) objects that can be referenced within the code:

```
<head>
  <title>iLink dev tags</title>
  <meta name="x-ilink-lookups" content="1"/>
  <meta name="x-ilink-classes" content="person"/>
  <meta name="x-ilink-attrs" content="person-id ."/>
  <meta name= "x-ilink-mode" content= "hoverCard spotAction"
/>
</head>
<body>
<p>iLink collaboration tags test</p>
<hr/>
<p>Here is a simple list</p>
<ul>
  <li><span class="person" person-id="test@test.com">First
Last</span></li>
  <li><span class="person" person-id="test2@test.com">First
Last</span></li>
  <li><a href="mailto:a@b.c">First Last</a></li>
```

-continued

```
<li><a href="mailto:sergeyv@esna.com">Sergey</a></li>
<li><span class="person" person-id="mo@esna.com">Mo</span></li>
<li><span class="person" person-id="arnoe@esna.com">Arno</span></li>
<li><span class="person" person-id="davidep@esna.com">Davide</span></li>
</ul>
<hr/>
```

Also there is an inline element sample <span class="person">bryand@esna.com</span>provided.

<hr/>

</body>

The actor app may provide weather related live information that is injected into web pages or web applications where corresponding embedded application tags are embedded. For example the weather actor app may be provided by a company that specializes in providing weather related information for example a national weather website. The embedded application tags may be embedded by a gaming company into their website, and the actor app may be installed on a user's computer accessing the gaming company website. Such information may include but is not limited to current temperatures, barometric pressures, wind speed, etc. where remote instruments may be continuously feeding data into the actor app and the actor app then injects this information on a web page where the corresponding embedded applications tags are present.

Other examples as to possible implementations are provided in the reference document at https://github.com/esna/Collaboration-Tags, incorporated herein by reference.

Devices where the invention can be advantageously used may include but not limited to a personal computer (PC), which may include but not limited to a home PC, corporate PC, a Server, a laptop, a Netbook, tablet computers, a Mac, touch-screen computers running any number of different operating systems e.g. MS Windows, Apple iOS, Google Android, Linux, Ubuntu, etc. a cellular phone, a Smartphone, a PDA, an iPhone, an iPad, an iPod, an iPad, a PVR, a settop box, wireless enabled Blu-ray player, a TV, a SmartTV, wireless enabled connected devices, e-book readers e.g. Kindle or Kindle DX, Nook, etc. and other such devices that may be capable of text, voice and video communications. Other embodiments of the invention may also use devices like Samsung's Smart Window, Google Glasses, Corning's new glass technologies, and other innovations and technologies that may be applicable to the invention at present or in the future.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

It should be understood that although the term application has been used as an example in this disclosure but in essence the term may also imply to any other piece of software code where the embodiments of the invention are incorporated. The software application can be implemented in a standalone configuration or in combination with other software programs and is not limited to any particular operating system or programming paradigm described here.

Several exemplary embodiments/implementations of the invention have been included in this disclosure, but the intent is to cover all such areas that may be benefit from the present system and method.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of receiving and rendering web content on a client device having an actor application installed on the client device, the method comprising:

the client device requesting web content from a server, the web content containing an embedded application tag;

the client device receiving web content from the server on the client device;

the actor application scanning the web content to determine if the web content includes a metatag;

if a metatag is present, the actor application determining if the metatag is on;

if the web content does not include the metatag or if the metatag is off, the actor application forgoes scanning the web content for the embedded application tag;

if the web content includes the metatag and if the metatag is on, the actor application scanning the web content for the embedded application tag;

based on the scanning, the actor application identifying the embedded application tag, wherein the embedded application tag includes a clickable action to execute a communication application;

the actor application receiving a value, associated with the embedded application tag, from dynamic data received with the web content, wherein the dynamic data includes an identity of a third party that is contacted through the communication application;

the actor application injecting the value in the embedded application tag;

the client device displaying the web content with the value of the dynamic data, the web content receiving selection of the clickable action;

in response to the received selection, the actor application executing the communication application; and the communication application initiating a contact with the third party.

2. The method of claim 1, wherein the web content is selected from the group consisting of HTML and WebRTC.

3. The method of claim 1, wherein the web content is displayed on a web browser.

4. The method of claim 1, wherein the web content is displayed on a web application.

5. The method of claim 1, wherein the dynamic data is a list of contact information for two or more persons.

6. The method of claim 5, wherein the dynamic data refreshes the list of contact information at selected intervals.

7. The method of claim 5, wherein the dynamic data refreshes the list of contact information when the value changes.

8. The method of claim 1, wherein the embedded application tag includes formatting instructions for the dynamic data.

9. The method of claim 1, wherein the embedded application tag renders a link that can be accessed to display the dynamic data.

10. The method of claim 1, wherein the embedded application tag includes instructions for rendering a graphic representing a link that can be accessed to display the dynamic data.

11. The method of claim 1, wherein the communication application is one of an email program, a SMS messaging application, and IM messaging application, and/or a web voice call application.

12. A method of receiving and rendering web content on a client device, the method comprising:

requesting web content from a server, the web content containing an embedded application tag;

determining whether an actor application has been installed on the client device;

receiving web content from the server on the client device;

if the actor application is present, the actor application scanning the web content to determine if the web content includes a metatag;

if a metatag is present, the actor application determining if the metatag is on;

if the web content does not include the metatag or if the metatag is off, the actor application forgoes scanning the web content for the embedded application tag;

if the web content includes the metatag and if the metatag is on, the actor application scanning the web content for the embedded application tag;

based on the scanning, the actor application identifying the embedded application tag, wherein the embedded application tag includes a clickable action to execute a communication application;

the actor application determining if the embedded application tag is on;

the actor application receiving a value, associated with the embedded application tag, from dynamic data received with the web content, wherein the dynamic data includes an identity of a third party that is contacted through the communication application;

the actor application injecting the value in the embedded application tag;

the client device displaying the web content with the value of the dynamic data on the client device;

the web content receiving selection of the clickable action;

in response to the received selection, the actor application executing the communication application; and the communication application initiating a contact with the third party.

13. The method of claim 12, wherein if the actor application is not present, the dynamic data is not displayed.

14. The method of claim 12, wherein if the actor application is not present, the dynamic data is hidden.

15. The method of claim 12, wherein if the actor application is not present, the dynamic data is not received.

16. The method of claim 12, wherein the embedded application tag has a hidden attribute.

17. A client device comprising:

a memory; and a processor in communication with the memory, the processor executes:

a web browser that:

requests web content from a server, wherein the web content contains an embedded application tag;

displays the web content, with a value injected into the embedded application tag by an actor application; and receives a selection of a clickable action;

the actor application that:

scans the web content to determine if the web content includes a metatag;

if the metatag is present, determines if the metatag is on;

if the web content does not include the metatag or if the metatag is off, forgoes scanning the web content for the embedded application tag;

if the web content includes the metatag and if the metatag is on, scans the web content for the embedded application tag;

based on the scanning, identifies the embedded application tag, wherein the embedded application tag includes the clickable action to execute a communication application;

determines if the embedded application tag is on;

receives the value, associated with the embedded application tag, from dynamic data received with the web content, wherein the dynamic data includes an identity of a third party that is contacted through the communication application;

injects the value in the embedded application tag; and in response to the received selection, executes the communication application; and the communication application that:

initiates a contact with the third party.

18. The client device of claim 17, wherein if the actor application is not present, the dynamic data is not displayed.

19. The client device of claim 17, wherein if the actor application is not present, the dynamic data is hidden.

20. The client device of claim 17, wherein if the actor application is not present, the dynamic data is not received.

* * * * *